Dec. 26, 1961  R. W. WOODRING ETAL  3,014,325
HAULM REMOVING ATTACHMENT FOR HAY CRUSHER
Filed June 22, 1959  2 Sheets-Sheet 2
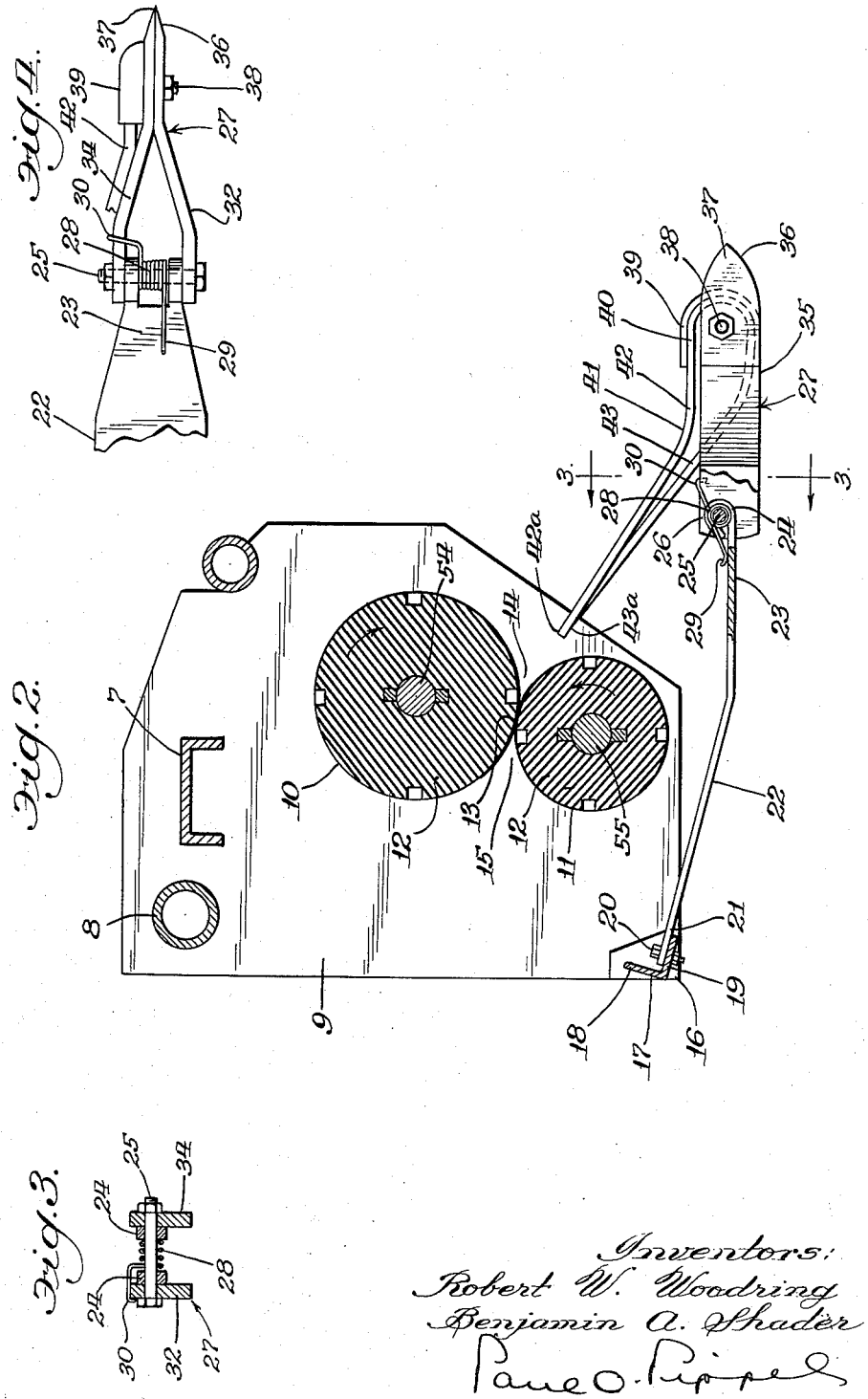
Inventors:
Robert W. Woodring
Benjamin A. Shader United States Patent Office 3,014,325
Patented Dec. 26, 1961

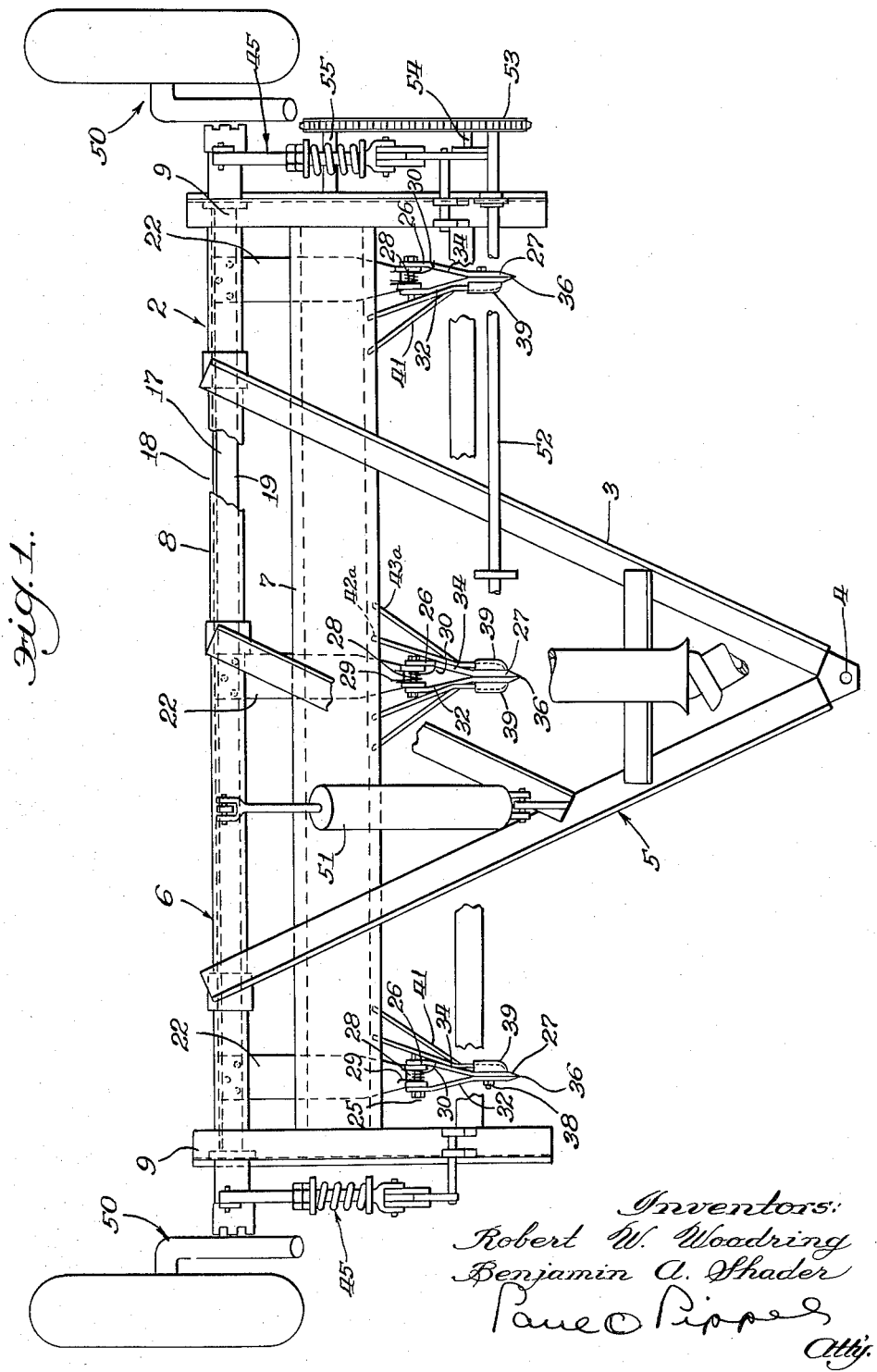

3,014,325
HAULM REMOVING ATTACHMENT FOR HAY CRUSHER
Robert W. Woodring, La Grange, and Benjamin A. Shader, Brookfield, Ill., assignors to International Harvester Company, Chicago, Ill., a corporation of New Jersey
Filed June 22, 1959, Ser. No. 821,956
1 Claim. (Cl. 56—1)

This invention relates to machines for removing vines from root crops such as potatoes preparatory to harvesting the crops.

A general object of the invention is to provide a novel vine removing mechanism, and more specifically, to provide an attachment for a hay crusher of the type comprising a pair of cooperating crushing rolls which function to pinch off and crush the vines in order to accelerate their drying and decomposition so as to minimize the nuisance of handling and sifting out the vines in the harvester.

A more specific object of the invention is to provide a novel attachment for a hay crusher which comprises a pair of upper and lower crushing rolls and wherein the lower roll serves in the normal use of the machine as a pickup for hay, and in the present instance vines, directly from the ground, the attachment serving to lift the vines off the ground and present them to the rolls through which they are drawn and pinched off the crops such as potatoes.

These and other objects of the invention will become more apparent from the specification and the drawings wherein:

FIG. 1 is a plan view of a hay crushing machine partially broken away and incorporating the invention.

FIG. 2 is a transverse vertical sectional view taken substantially on the line 2—2 of FIG. 1;

FIG. 3 is a cross-sectional view on line 3—3 of FIGURE 2, and

FIG. 4 is an enlarged fragmentary plan view.

Describing the invention in detail, there is shown a hay crusher or conditioner generally designated 2 which includes a main framework 3 having a forward attachment point 4 for connection to an associated tractive vehicle such as a tractor, the framework 3 including the draft frame generally designated 5 which at its rear end is connected to the main frame structure generally indicated 6 of the crusher, said main frame structure 6 including a pair of transverse beam members 7 and 8 which are suitably connected to the draft frame structure 5, the said frame member 6 having a pair of end or side members 9 which depend from the main frame members 7 and 8 and suitably support a pair of crushing rolls 10 and 11, said rolls 10 being the upper roll and being of larger diameter than the lower roll 11 which serves as a combination crushing roll and pickup.

It will be understood that the rolls 10 and 11 each comprise a body portion 12 of elastomer material and that in engaged position as shown in FIG. 2 the body portions 12 are engaged in an area 13 wherein the body portions are deformed, said upper and lower rolls defining a forwardly open bight 14 and a rear discharge vertex 15 through which the vines or crops are adapted to be discharged rearwardly of the machine.

The side portions 9 of the main frame are interconnected adjacent to their lower rear corners 16 by a transverse beam member 17 in the form of an angle iron which has an upstanding rear web 18 and a forwardly extending bottom web 19, said bottom web serving as an anchor for bolts 20 which connect the rear ends 21 of downwardly and forwardly extending arms 22, the arms 22 passing under the lower combination crushing and pickup roll 11 and at their forward portions 23 projecting forwardly of the crushing rolls and terminating in pivotal connections as at 24 each in the nature of an eye which admits a pin 25 therethrough.

The pin or bolt 25 pivotally mounts the rear end 26 of a pickup shoe 27 and supports a spring 28 which has one end 29 engaged with the top side of the arm 22 and the other end 30 engaged with a portion of the shoe, which in the present instance may comprise a bifurcated structure including a pair of rearwardly side elements 32 and 34 which embrace the eye structure 24 at the forward end of the support arm 22. It will be seen that the torsion spring 28 downwardly biases the shoe 27 which is provided with a lower runner edge 35 and a forwardly pointed nose 36 for parting the vines. The nose portion 36, rearwardly of its pointed forward end 37, is provided with a transverse bolt 38 which in the instance of the end shoes, that is those at opposite ends of the device as shown in FIG. 1, supports only one mounting and securing clamp 39 on its inboard side whereas the center shoe supports the clamps 39, 39 at opposite sides of the shoe.

Each clamp 39 houses the forward bight end or loop 40 on a guide structure 41 having a pair of whiskers or guides 42 and 43 which are arranged in superposed relationship and cross each other and fan out rearwardly so as to provide a broad support for the crops which are dragged onto the guides by the forward motion of the machine, said guides or fingers 42 and 43 terminating in rear extremities 42a, 43a which are disposed in proximity of the bight portion 14.

It will be seen that in operation the crushing unit which is carried by the wheel and axle assembly 50 is actuated by the hydraulic unit 51 to position the unit in operating or transport position. The rolls 11 and 12 are held in engagement by the toggle linkages 45 and driven by the shaft 52 through a chain and sprocket system or belt drive 53 which drives the shafts 54 and 55 of rolls 12 and 11, the rolls operating with an inward sweep as shown by the arrows in FIG. 2 and discharging in a flowing stream on their rear sides.

We claim:

In a hay conditioner having a support including a transverse bottom member, a pair of superposed crushing rolls mounted upon the support ahead and above said member and providing a forwardly facing bite, a plurality of arms mounted upon said member and extending under the rolls and terminating in forward ends ahead and below said rolls, a shoe pivoted to the forward end of each arm, spring means reacting between the shoe and arm biasing the latter downwardly, and guide means mounted on at least one side of each shoe and including a member having a loop portion adjacent the shoe and a pair of rearwardly diverging legs extending diagonally upwardly from the shoe to said bite for directing vines thereinto.

References Cited in the file of this patent
UNITED STATES PATENTS

| | | |
|---|---|---|
| 1,419,158 | Luce | June 13, 1922 |
| 1,883,694 | Goble | Oct. 18, 1932 |
| 1,958,910 | Christiansen | May 15, 1934 |